US011858745B2

(12) United States Patent
Hoover et al.

(10) Patent No.: US 11,858,745 B2
(45) Date of Patent: Jan. 2, 2024

(54) CHAIN CONVEYOR AND LINK FOR SAME

(71) Applicant: Joy Global Underground Mining LLC, Warrendale, PA (US)

(72) Inventors: Joseph Daniel Hoover, Hermitage, PA (US); Grant William Johanningsmeier, Haubstadt, IN (US); Dirk Johannes van Dyk, Gibsonia, PA (US); Christopher George Stewart, Oil City, PA (US); Benjamin Scott Patterson, Ellwood City, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 42 days.

(21) Appl. No.: 17/587,328

(22) Filed: Jan. 28, 2022

(65) Prior Publication Data

US 2022/0234835 A1    Jul. 28, 2022

Related U.S. Application Data

(60) Provisional application No. 63/159,652, filed on Mar. 11, 2021, provisional application No. 63/142,989, filed on Jan. 28, 2021.

(51) Int. Cl.
  *B65G 19/24*  (2006.01)
  *B65G 19/20*  (2006.01)
  (Continued)

(52) U.S. Cl.
  CPC .............. *B65G 19/08* (2013.01); *B65G 19/20* (2013.01); *B65G 19/24* (2013.01); *F16G 13/02* (2013.01)

(58) Field of Classification Search
  CPC ........ B65G 17/06; B65G 17/26; B65G 19/08; B65G 19/20; B65G 19/24; F16G 13/02
  (Continued)

(56) References Cited

U.S. PATENT DOCUMENTS

| 231,186 A | 8/1880 | Neacy |
|---|---|---|
| 572,991 A | 12/1896 | Howard |
| (Continued) | | |

FOREIGN PATENT DOCUMENTS

| CN | 1044627 A | 8/1990 |
|---|---|---|
| CN | 2211981 Y | 11/1995 |
| (Continued) | | |

OTHER PUBLICATIONS

Bureau of Mines United States Department of the Interior, "Noise Study of Longwall Mining Systems," Jan. 1986, Contract JO188072, Wyole Laboratories, cover page, p. 3, pp. 131-137 (9 pages).
(Continued)

*Primary Examiner* — Douglas A Hess
(74) *Attorney, Agent, or Firm* — Husch Blackwell LLP

(57) ABSTRACT

Mining machines such as continuous miners and chain haulage units may include chain conveyors that are capable of deflecting laterally in order to travel through lateral turns. The chain conveyors may include flight members for pushing or urging material along a pan. The chain may be driven by one or more sprockets. In one independent aspect, a link for a chain conveyor includes a body including a first end a second end opposite the first end, a first opening proximate the first end and extending in a direction transverse to a direction of travel of the link, a second opening proximate the second end and extending in a direction transverse to the direction of travel of the link, and a relief opening extending through the link body and positioned between the first end and the second end.

19 Claims, 11 Drawing Sheets

(51) Int. Cl.
  *B65G 17/06* (2006.01)
  *B65G 17/26* (2006.01)
  *B65G 19/08* (2006.01)
  *F16G 13/02* (2006.01)

(58) Field of Classification Search
  USPC .......................................................... 198/730
  See application file for complete search history.

(56) References Cited

U.S. PATENT DOCUMENTS

| | | | |
|---|---|---|---|
| 708,924 | A | 9/1902 | Scott et al. |
| 1,008,890 | A | 11/1911 | Demarest |
| 1,020,863 | A | 3/1912 | Weichseldorfer |
| 1,153,375 | A | 9/1915 | Elliott |
| 1,427,229 | A | 8/1922 | Robbins et al. |
| 1,699,334 | A | 1/1929 | Petersen |
| 1,869,050 | A | 7/1932 | Coppage |
| 2,222,025 | A | 11/1940 | Fischer |
| 2,386,619 | A | 10/1945 | Long et al. |
| 2,450,501 | A | 10/1948 | Clarkson |
| 2,674,365 | A | 4/1954 | Russell |
| 2,754,957 | A | 7/1956 | Dodson |
| 2,761,548 | A | 9/1956 | Long |
| 2,784,836 | A | 3/1957 | Tourneau |
| 3,005,358 | A | 10/1961 | Musser |
| 3,089,579 | A | 5/1963 | Beck |
| 3,103,275 | A | 9/1963 | Rollins |
| 3,119,276 | A | 1/1964 | Pearson |
| 3,145,576 | A | 8/1964 | Proctor |
| 3,225,897 | A | 12/1965 | Rollins |
| 3,324,990 | A | 6/1967 | Karlovsky, Jr. |
| 3,452,228 | A | 6/1969 | Woolley |
| 3,472,563 | A | 10/1969 | Iregens |
| 3,540,566 | A | 11/1970 | Perry et al. |
| 3,602,364 | A | 8/1971 | Maglio et al. |
| 4,037,713 | A | 7/1977 | Soliman et al. |
| 4,175,797 | A | 11/1979 | Krekeler |
| 4,202,219 | A | 5/1980 | Weis |
| 4,218,932 | A | 8/1980 | McComber |
| 4,238,028 | A | 12/1980 | Lake |
| 4,461,372 | A | 7/1984 | Bekkala et al. |
| 4,585,117 | A | 4/1986 | Hahn |
| 4,766,995 | A | 8/1988 | Sterwerf, Jr. |
| 4,844,314 | A | 4/1989 | Wilson, III |
| 4,899,868 | A | 2/1990 | Johnson |
| 4,917,658 | A | 4/1990 | Sugimoto et al. |
| 4,964,344 | A | 10/1990 | Robinson |
| 5,000,310 | A | 3/1991 | Edmondson |
| 5,056,651 | A | 10/1991 | Nagamatsu |
| 5,088,594 | A | 2/1992 | Edmondson |
| 5,096,048 | A | 3/1992 | Lachner et al. |
| 5,156,256 | A | 10/1992 | David |
| 5,165,766 | A | 11/1992 | Thomas |
| 5,177,949 | A | 1/1993 | Stadele et al. |
| 5,186,526 | A | 2/1993 | Pennington |
| 5,213,199 | A | 5/1993 | Braun et al. |
| 5,215,185 | A * | 6/1993 | Counter ................. B65G 17/08 |
| | | | 198/853 |
| 5,226,526 | A | 7/1993 | O'Brien |
| 5,249,664 | A | 10/1993 | Steinkuhl |
| 5,305,872 | A | 4/1994 | Hutton |
| 5,628,393 | A | 5/1997 | Steeber |
| 5,669,680 | A | 9/1997 | Bertoni |
| 5,762,424 | A | 6/1998 | Harris et al. |
| 5,911,305 | A * | 6/1999 | Layne ................... B65G 17/086 |
| | | | 198/852 |
| 6,640,534 | B1 | 11/2003 | Harnaes et al. |
| 6,662,932 | B1 | 12/2003 | O'Neill |
| 7,036,657 | B1 | 5/2006 | Robinson |
| 7,118,648 | B2 | 10/2006 | Dever et al. |
| 7,364,036 | B2 * | 4/2008 | Schoepf ................ B65G 17/08 |
| | | | 198/852 |
| 7,422,256 | B2 | 9/2008 | Mueller |
| 7,438,180 | B1 | 10/2008 | Taylor et al. |
| 7,442,139 | B2 | 10/2008 | Kubo et al. |
| 7,540,374 | B2 | 6/2009 | Rathbun et al. |
| 7,624,858 | B2 * | 12/2009 | Delair ................... B65G 17/40 |
| | | | 198/853 |
| 7,997,402 | B2 | 8/2011 | Merten et al. |
| 8,016,102 | B2 | 9/2011 | Morris |
| 8,038,558 | B2 | 10/2011 | Klabisch et al. |
| 8,141,696 | B2 | 3/2012 | O'Neill |
| 8,177,049 | B2 | 5/2012 | O'Neill |
| 8,360,912 | B2 | 1/2013 | Klabisch et al. |
| 8,448,781 | B2 | 5/2013 | Morris |
| 8,453,826 | B2 | 6/2013 | Morris |
| 8,672,110 | B2 | 3/2014 | Jaeger |
| 8,936,146 | B2 | 1/2015 | Morris |
| 8,950,571 | B2 | 2/2015 | O'Neill |
| 8,978,877 | B2 | 3/2015 | O'Neill |
| 9,227,787 | B2 | 1/2016 | Morris et al. |
| 9,284,124 | B2 | 3/2016 | Klingbeil |
| 9,415,939 | B2 | 8/2016 | Arnold et al. |
| 9,434,428 | B2 | 9/2016 | Hakes et al. |
| 9,487,358 | B2 | 11/2016 | Morris et al. |
| 10,106,325 | B2 | 10/2018 | Walker et al. |
| 10,138,064 | B2 * | 11/2018 | Dorisio ................. B65G 17/08 |
| 10,150,617 | B2 | 12/2018 | O'Neill |
| 10,392,193 | B2 | 8/2019 | Walker et al. |
| 10,414,594 | B2 | 9/2019 | Walker et al. |
| 10,442,627 | B2 | 10/2019 | Walker et al. |
| 10,556,748 | B1 * | 2/2020 | Bruere ................... B65G 19/26 |
| 10,604,347 | B2 | 3/2020 | Walker et al. |
| 10,717,603 | B2 | 7/2020 | Walker et al. |
| 10,875,717 | B2 | 12/2020 | Morris et al. |
| 10,974,905 | B2 | 4/2021 | Walker et al. |
| 10,981,728 | B2 | 4/2021 | Walker et al. |
| 11,235,933 | B2 * | 2/2022 | Fye ........................ B65G 23/06 |
| 11,440,736 | B2 * | 9/2022 | Walker ................... B65G 19/24 |
| 11,530,095 | B2 * | 12/2022 | Walker ................... B65G 19/18 |
| 2002/0050442 | A1 | 5/2002 | Malitzki |
| 2002/0129732 | A1 | 9/2002 | Marshall |
| 2004/0140182 | A1 | 7/2004 | Morris |
| 2005/0027459 | A1 | 2/2005 | Ecker et al. |
| 2005/0176539 | A1 | 8/2005 | Hirschmann |
| 2005/0274590 | A1 | 12/2005 | Kwiat |
| 2006/0058144 | A1 | 3/2006 | Acerda |
| 2006/0172841 | A1 | 8/2006 | Nunez et al. |
| 2007/0107412 | A1 | 5/2007 | Humcke et al. |
| 2008/0011588 | A1 | 1/2008 | Frost et al. |
| 2008/0284245 | A1 | 11/2008 | Livesay et al. |
| 2009/0218199 | A1 | 9/2009 | Russell |
| 2009/0250318 | A1 | 10/2009 | O'Neill |
| 2009/0277757 | A1 | 11/2009 | Boudreau |
| 2009/0318239 | A1 | 12/2009 | Kampf |
| 2010/0276254 | A1 | 11/2010 | O'Neill |
| 2011/0067793 | A1 | 3/2011 | Nukushina |
| 2011/0067980 | A1 | 3/2011 | Martin |
| 2011/0088367 | A1 | 4/2011 | Powell et al. |
| 2011/0315521 | A1 | 12/2011 | O'Neill |
| 2012/0048684 | A1 | 3/2012 | Morris |
| 2013/0203539 | A1 | 8/2013 | Kirchner et al. |
| 2013/0227833 | A1 | 9/2013 | Rizzo |
| 2013/0284569 | A1 | 10/2013 | Studer |
| 2013/0334015 | A1 | 12/2013 | Lasecki |
| 2014/0027247 | A1 | 1/2014 | Cox et al. |
| 2014/0116850 | A1 | 5/2014 | Musick et al. |
| 2014/0131177 | A1 | 5/2014 | Delair et al. |
| 2014/0239699 | A1 | 8/2014 | O'Neill |
| 2015/0008101 | A1 | 1/2015 | Miglava |
| 2015/0101912 | A1 | 4/2015 | Morris et al. |
| 2015/0191313 | A1 | 7/2015 | Arnold et al. |
| 2015/0266527 | A1 | 9/2015 | Akinlua et al. |
| 2015/0353152 | A1 | 12/2015 | Hakes et al. |
| 2016/0159417 | A1 | 6/2016 | Zimmer et al. |
| 2016/0200520 | A1 | 7/2016 | Menke et al. |
| 2017/0137226 | A1 | 5/2017 | Morris et al. |
| 2018/0251312 | A1 | 9/2018 | Walker et al. |

FOREIGN PATENT DOCUMENTS

| | | | |
|---|---|---|---|
| CN | 1517280 | A | 8/2004 |
| CN | 201087012 | Y | 7/2008 |

(56) References Cited

FOREIGN PATENT DOCUMENTS

| | | | |
|---|---|---|---|
| CN | 101602433 A | 12/2009 |
| CN | 101875433 A | 11/2010 |
| CN | 102227361 A | 10/2011 |
| CN | 102639391 A | 8/2012 |
| CN | 103419853 A | 12/2013 |
| CN | 103608250 A | 2/2014 |
| CN | 104295668 A | 1/2015 |
| CN | 105083860 A | 11/2015 |
| CN | 204916962 U | 12/2015 |
| CN | 105221664 A | 1/2016 |
| CN | 105386759 A | 3/2016 |
| CN | 106170450 A | 11/2016 |
| DE | 3151059 A1 | 7/1983 |
| DE | 19633298 A1 | 2/1998 |
| DE | 20300239 U1 | 3/2003 |
| DE | 20310521 U1 | 11/2004 |
| DE | 102014224018 A1 | 5/2015 |
| EP | 1197671 A1 | 4/2002 |
| EP | 2147875 A2 | 1/2010 |
| EP | 2221495 A1 | 8/2010 |
| EP | 2436944 A2 | 4/2012 |
| GB | 205440 A | 10/1923 |
| GB | 658623 A | 10/1951 |
| GB | 671424 A | 5/1952 |
| GB | 2458768 A | 10/2009 |
| JP | 2002120921 A | 4/2002 |
| JP | 5576263 B2 | 8/2014 |
| RU | 2064393 C1 | 7/1996 |
| RU | 2091286 C1 | 9/1997 |
| SU | 713780 A1 | 2/1980 |
| SU | 963922 A2 | 10/1982 |
| WO | 9008716 A1 | 8/1990 |
| WO | 03013987 A2 | 2/2003 |
| WO | 2012054775 A1 | 4/2012 |
| WO | 2014076164 A1 | 5/2014 |
| WO | 2014197383 A2 | 12/2014 |
| WO | 2016138010 A1 | 9/2016 |

OTHER PUBLICATIONS

Leikin A. E., Rodin B.1., "Adhesive Materials", Material Sciences. M., High School, 1971, p. 405, http://www.nglib.ru/book_view .jsp?idn=0164 70&page=405&format=free.

European Extended Search Report for Application No. 22153906.7 dated Oct. 14, 2022 (16 pages).

European Patent Office Partial Search Report for Application No. 22153906.7 dated Jul. 12, 2022 (19 pages).

* cited by examiner

CHAIN CONVEYOR AND LINK FOR SAME

CROSS-REFERENCE TO RELATED APPLICATIONS

This application claims the benefit of U.S. Provisional Patent Application No. 63/142,989, filed Jan. 28, 2021, and U.S. Provisional Patent Application No. 63/159,652, filed Mar. 11, 2021. The entire contents of each of these documents are incorporated by reference herein.

BACKGROUND

The present disclosure relates to material conveyors, and particularly to chain and flight conveyors.

SUMMARY

Mining machines such as continuous miners and chain haulage units may include chain conveyors that are capable of deflecting laterally in order to travel through lateral turns. The chain conveyors may include flight members for pushing or urging material along a pan. The chain may be driven by one or more sprockets.

In one independent aspect, a link for a chain conveyor includes a link body including a first end and a second end opposite the first end, a first opening proximate the first end and extending in a direction transverse to a direction of travel of the link, a second opening proximate the second end and extending in a direction transverse to the direction of travel of the link, and a relief opening extending through the link body and positioned between the first end and the second end. The first opening is configured to receive a first connecting member, and the second opening is configured to receive a second connecting member.

In another independent aspect, a link for a conveyor chain includes a body having an inner surface, and a flight bar extending laterally away from the body opposite the inner surface. The inner surface including at least one opening therein, and the at least one opening is configured to receive a coupling pin. The flight bar including a leading side and a trailing side. A lower surface of the flight bar including a first edge proximate the leading side and a second edge proximate the trailing side. The flight bar further includes a recess disposed between the first edge and the second edge and extending at least partially along a length of the flight bar.

In yet another independent aspect, a conveyor chain includes a first flight link including an arcuate inner surface facing a centerline of the conveyor chain and a flight bar extending laterally away from the centerline of the conveyor chain. The flight bar including a recess defining two edges configured to scrape material along a conveyor deck. The conveyor chain further includes a second flight link disposed laterally opposite the first flight link. The second flight link including an arcuate inner surface facing the centerline of the conveyor chain and a flight bar extending laterally away from the centerline of the conveyor chain in a direction opposite the flight bar of the first flight link. The flight bar including a recess defining two edges configured to scrape material along the conveyor deck. The conveyor chain further includes a connecting link positioned between the first flight link and the second flight link, and at least one pin coupling the first flight link, the connecting link, and the second flight link. The connecting link including a relief opening extending therethrough.

Other aspects will become apparent by consideration of the detailed description and accompanying drawings.

Figure 1:
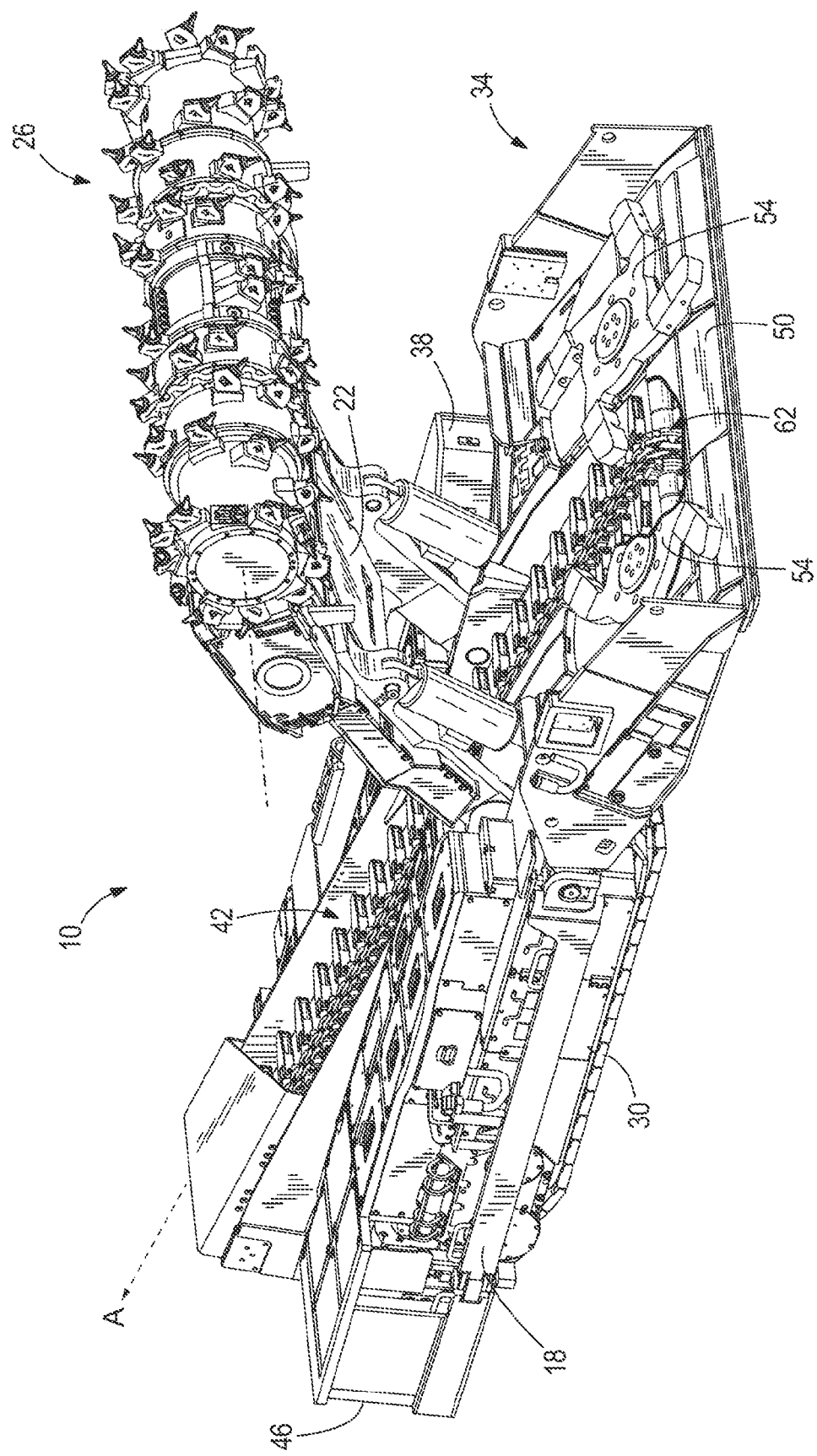
FIG. 1 is a perspective view of a mining machine with a portion of a gathering head cutaway.

Before any independent embodiments of the disclosure is explained in detail, it is to be understood that the disclosure is not limited in its application to the details of the construction and the arrangements of components set forth in the following description or illustrated in the drawings. The disclosure is capable of other independent embodiments and of being practiced or being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling.

DETAILED DESCRIPTION

FIG. 1 illustrates a mining machine 10, such as a continuous mining machine. In the illustrated embodiment, the mining machine 10 includes a frame or chassis 18, a boom 22 pivotably coupled to the chassis 18, and a cutter head 26 supported on the boom 22. The chassis 18 may be supported for movement relative to a support surface (not shown) by a traction mechanism (e.g., crawlers 30).

As shown in FIG. 1, a collecting mechanism or gathering head 34 is positioned adjacent a first end or forward end 38 of the chassis 18, and a conveyor 42 extends in a continuous loop from the forward end 38 of the chassis 18 toward a second or rear end 46 of the chassis 18. The gathering head 34 is positioned below the cutter head 26 and includes a deck 50 and a device (e.g., rotating arms 54) that directs dislodged material onto the conveyor 42. The conveyor 42 transports the cut material along a direction of travel A from the forward end 38 toward the rear end 46 of the chassis 18, from the area below the cutter head 26 to another conveyor or a haulage machine (not shown) positioned proximate the rear end 46 of the chassis 18.

The conveyor 42 is a chain conveyor formed by chain link connected sequentially in a continuous loop. The conveyor 42 drives cut material along a chain pan or deck. The conveyor 42 is driven by a drive assembly. In some embodiments, the drive assembly includes a shaft oriented laterally relative to the chassis 18 and is driven (e.g., by one or more motors) to rotate relative to the chassis 18, and a sprocket 62 (FIG. 1) is coupled to the shaft and drives the conveyor 42 due to rotation of the shaft.

Figure 2:
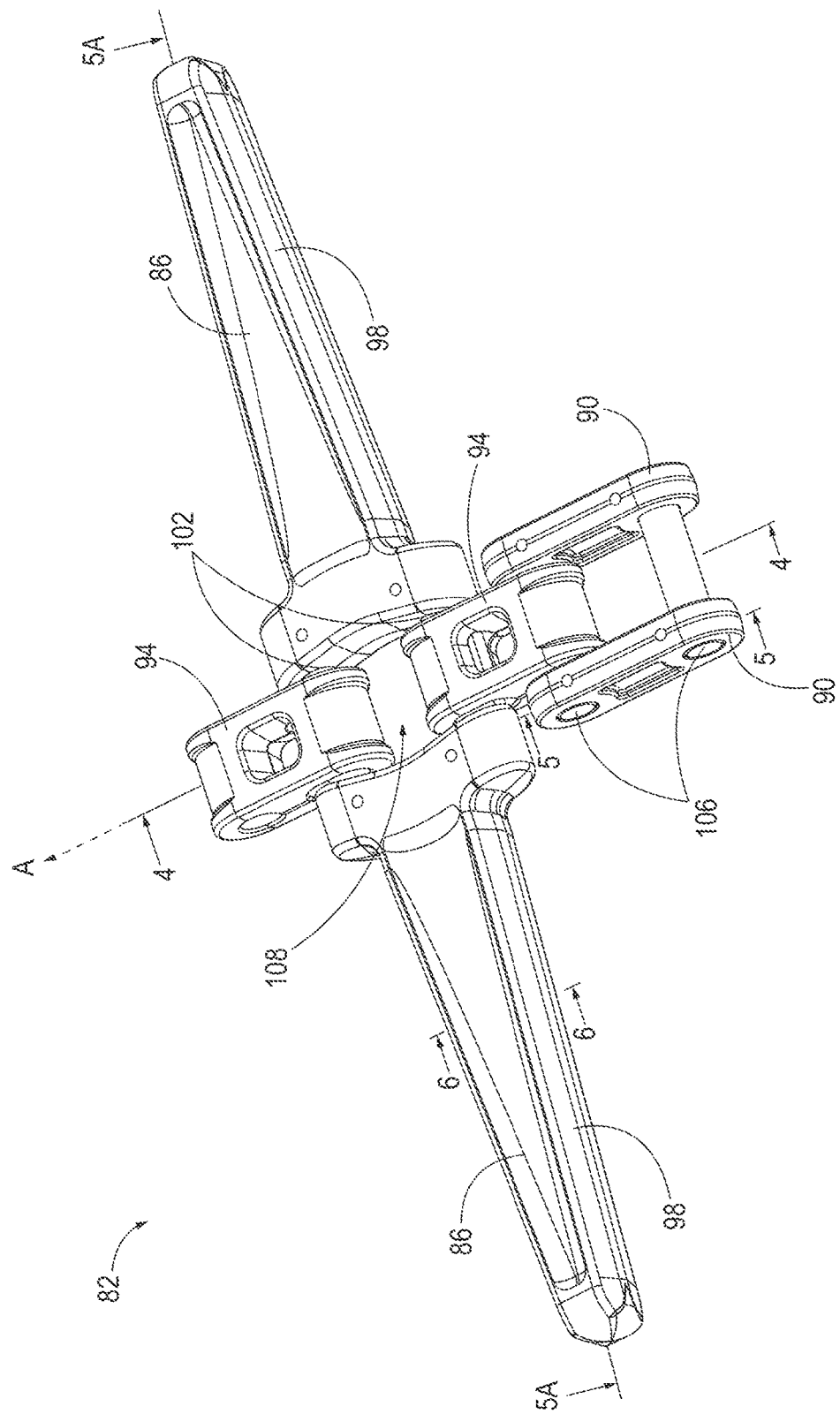
FIG. 2 is a perspective view of a chain conveyor unit.

FIG. 2 shows a unit of a chain 82 that forms the conveyor 42. In the illustrated embodiment, the chain 82 includes a pair of flight links 86, a pair of side links 90, and a coupler link or connecting link 94 coupling the flight links 86 to the side links 90, and flights or flight bars 98 positioned laterally outward from the flight link 86. Each flight link 86 is coupled to the adjacent connecting links 94 by flight pins 102, and each side link 90 is coupled to the adjacent connecting links 94 by pins 106. A gap 108 is formed between adjacent connecting links 94, and the teeth of the sprocket 62 pass into the gap 108 between the connecting links 94 to engage and drive the conveyor chain 82.

In the illustrated embodiment, the conveyor chain 82 includes a sequence of alternating flight links and connecting links, each joined to one another by swivel links. In other embodiments, the chain 82 may include a different sequence of links—for example, multiple connecting links may be positioned between one flight link and the subsequent flight link. Various permutations of the link sequence are possible. Also, in the illustrated embodiment, the spacing between each flight pin 102 and an adjacent connecting pin 106 is different from the spacing between each flight pin 102 and an adjacent flight pin 102.

Figure 3:
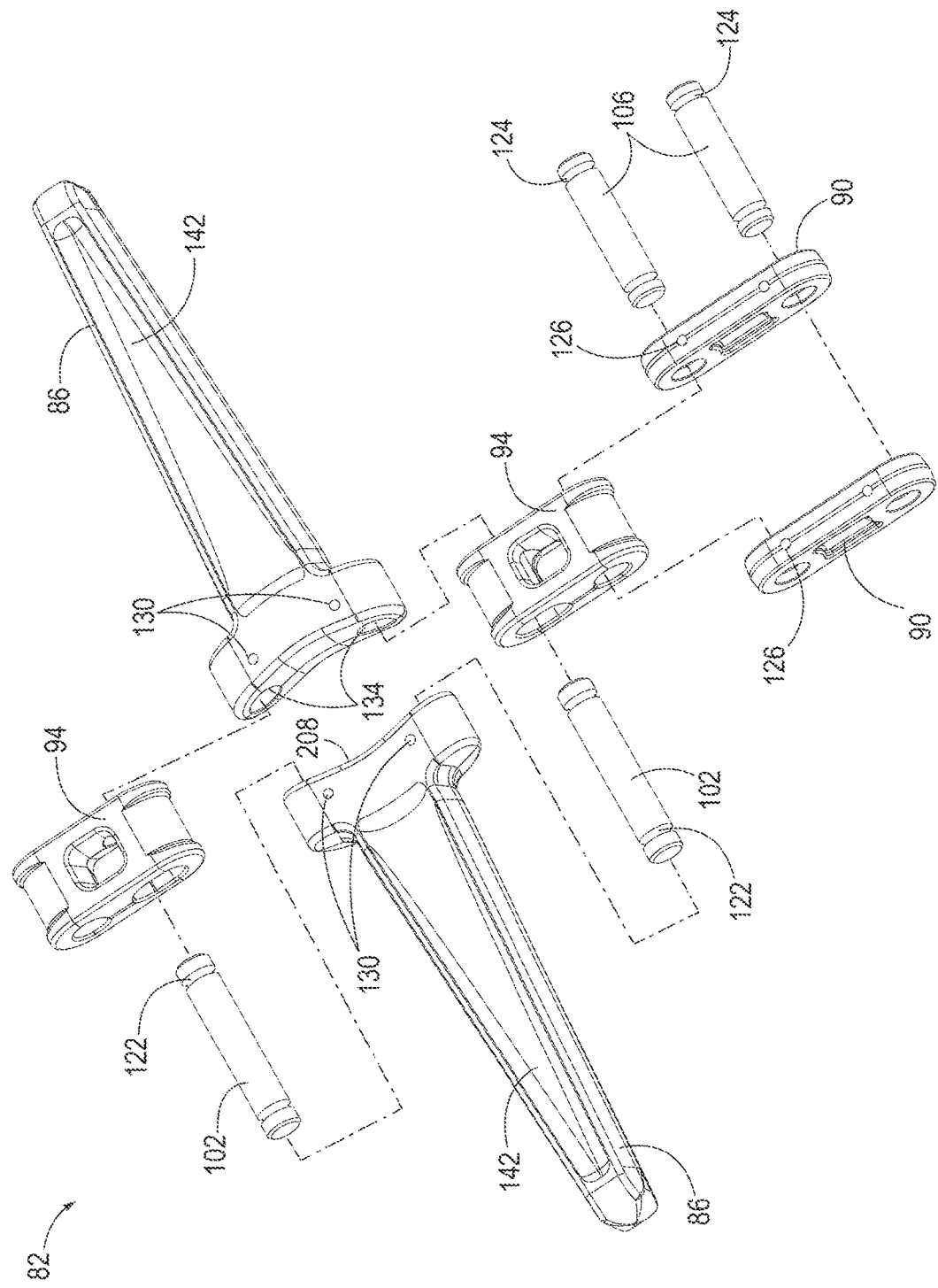
FIG. 3 is an exploded view of the chain conveyor unit of FIG. 2.
Figure 4:
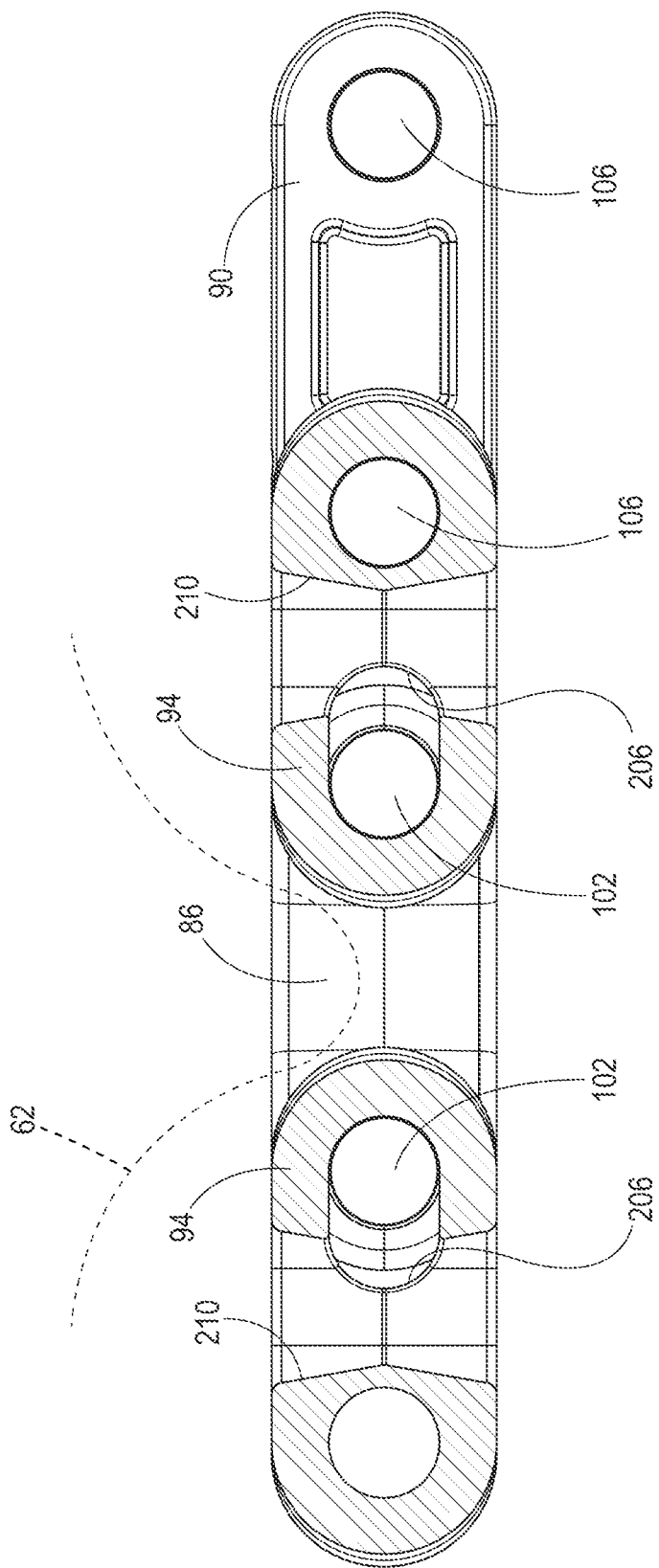
FIG. 4 is a section view of the chain conveyor unit of FIG. 2, viewed along section 4-4.

As shown in FIGS. 2-4, the flight pins 102 extend through the connecting link 94 and each end of the flight pins 102 is received within an end portion of one of the flights 86. Similarly, the connecting pins 106 extend through the connecting link 94 and each end of the connecting pins 106 is received within one of the side links 90. Each of the flight pins 102 and the connecting pins 106 includes a peripheral groove 122, 124, each of which extends around an outer surface adjacent an end of the associated flight pins 102 and connecting pins 106.

Figure 5:
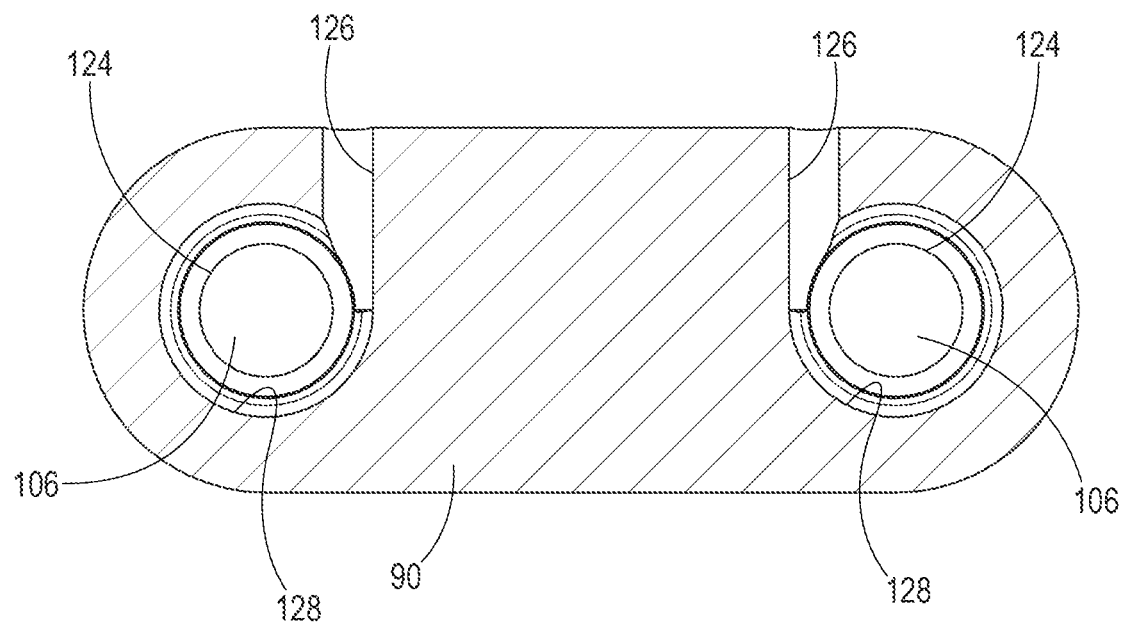
FIG. 5 is a section view of a side link, viewed along section 5-5 of FIG. 2.

As shown in FIG. 5, when the ends of the connecting pins 106 are positioned within openings in the side links 90, each peripheral groove 124 of the connecting pins 106 is aligned with a hole 126 extending between the opening in the associated side link 90 and an outer surface of the side link 90. The groove 124 is also aligned within a complementary groove 128 extending at least partially along the perimeter of the opening. A retainer (e.g., an elongated wire, not shown) can be inserted into the hole 126 to wrap around the peripheral groove 124, thereby engaging the groove 124 and the groove 128 to retain the connecting pin 126. In some embodiments, the retainer may be formed from a polymeric material (e.g., plastic, nylon) that can be broken by an operator to facilitate removal of the pins 106 for replacement/servicing.

Figure 5A:
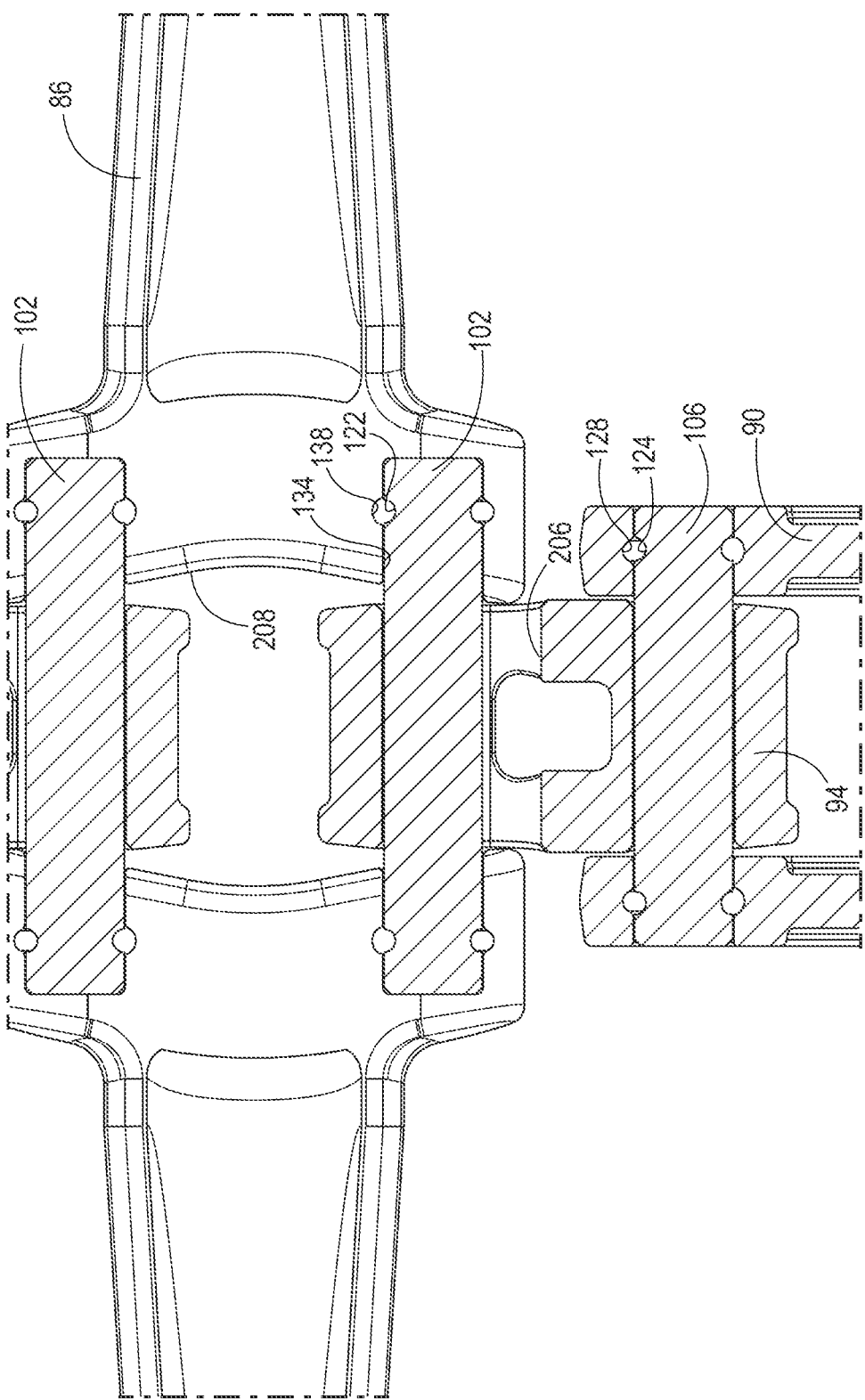
FIG. 5A is a section view of a chain conveyor unit of FIG. 2, viewed along section 5A-5A.

Each flight 86 includes an inner surface 208 including a pair of openings 134, each of which receives an end of one of the flight pins 102. As shown in FIG. 5A, each of the openings 134 is formed as a blind hole, and the end of the flight pins 102 are enclosed within the flight 86. Similar to the engagement between the side links 90 and the connecting pins 106, when the ends of the flight pins 102 are positioned within the openings 134 of the flights 86, each peripheral groove 122 of the flight pins 102 is aligned with a hole 130 and a groove 138 extending around an inner surface of the opening 134. It is understood that the flight pins 102 and the end portions of the flights 86 are coupled in a similar manner to the connecting pins 106 and side links 90. In some embodiments, the retainer may be formed from a polymeric material (e.g., plastic, nylon) that can be broken by an operator to facilitate removal of the pins 102 for replacement/servicing.

Figure 6:
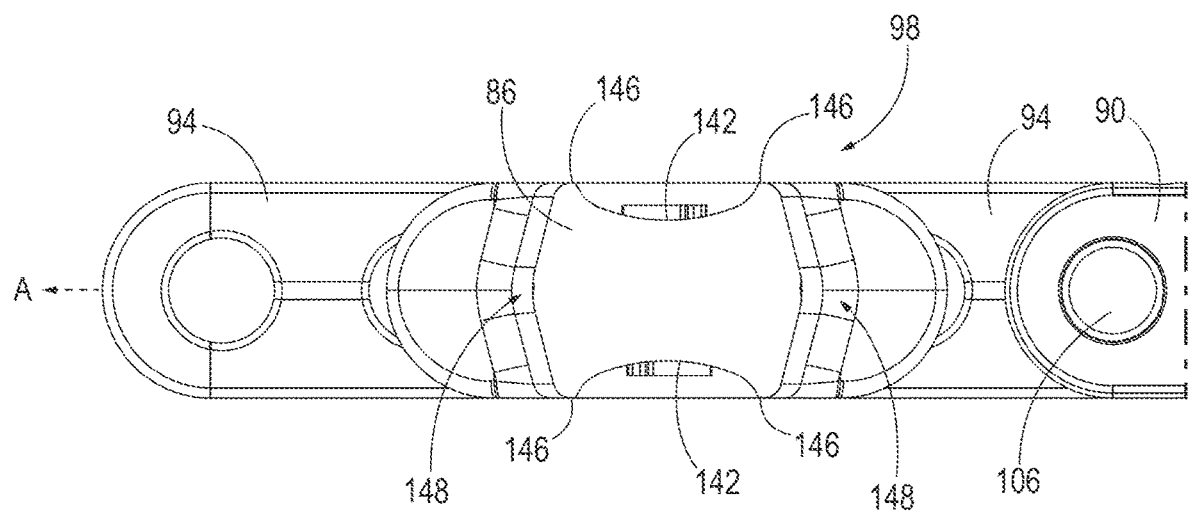
FIG. 6 is a section view of the chain conveyor unit of FIG. 2, viewed along section 6-6.

As shown in FIGS. 2 and 6, each flight 86 includes a recess 142 extending substantially along the length of the flight bar 98. In some embodiments, the recess 142 extends along a portion of the length of the flight bar 98. As shown in FIG. 6, the recess 142 may have an arcuate (e.g., elliptical) profile relative to a transverse section of the flight 86, and the recess 142 tapers such that the recess 142 becomes narrower toward the distal end of the flight 86. In addition, the flight 86 includes two edges 146 on each side of the recess 142, and the edges 146 provide multiple engagement regions for scraping material along the conveyor deck. Also, in other embodiments the recess 142 may have a differently shaped profile (e.g., rectangular shaped, V-shaped, etc.).

Figure 6A:
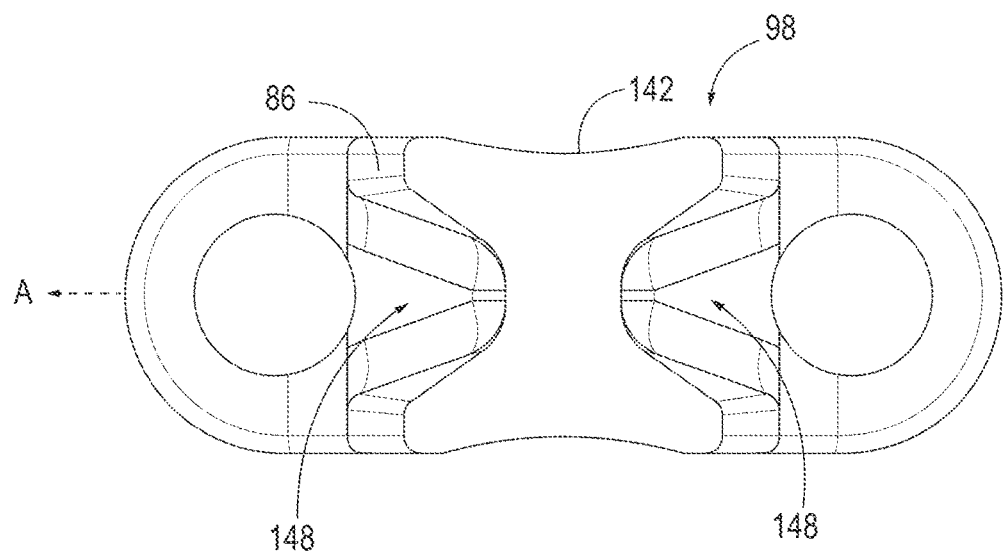
FIG. 6A is a section view of a flight according to another embodiment, viewed along a similar section as 6-6.

In addition, rather than being planar, the sides 148 of the flight bar 98 protrude outwardly at a middle section and taper inwardly toward the upper and lower surfaces. Stated another way, the side surfaces 148 of the flight bar 98 are convex such that the flight bar 98 is widest near a center portion. In other embodiments, as shown in FIG. 6A, the side surfaces 148 of the flight bar 98 are concave such that the flight bar 98 is narrowest near a center portion. The concave shape provides an X-shaped profile, which may require less material and be lighter while still maintaining sufficient strength. In some embodiments, the flight bar 98 is symmetric about a plane encompassing the direction of travel A (e.g., about a horizontal plane).

Figure 7:
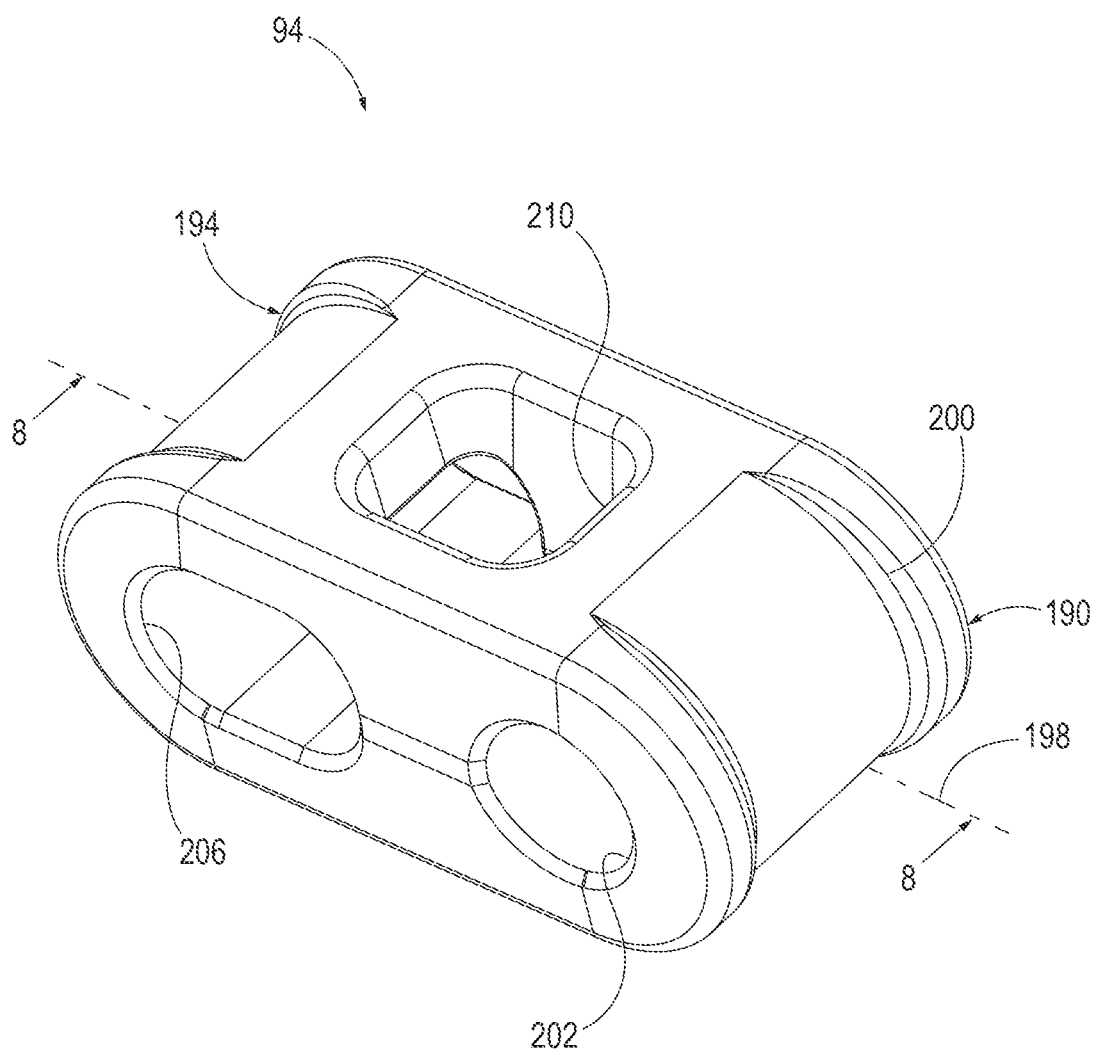
FIG. 7 is a perspective view of a connecting link.
Figure 8:
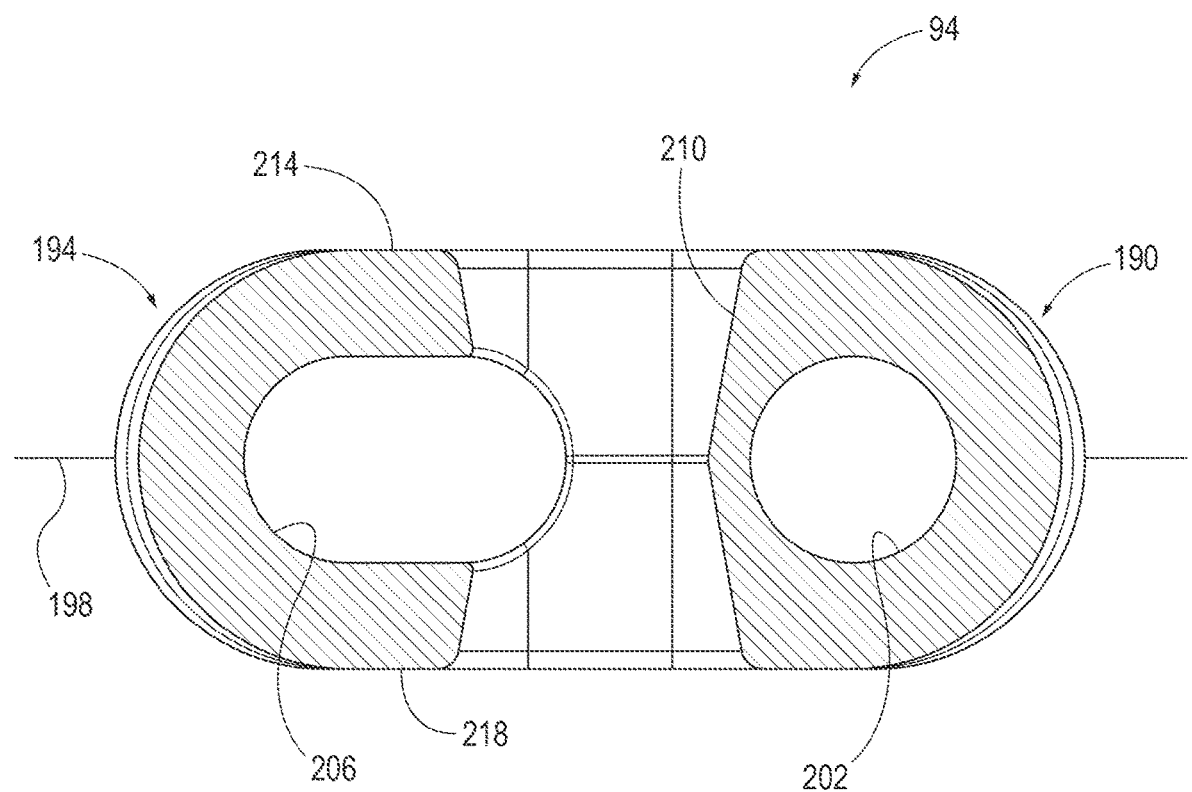
FIG. 8 is a section view of the connecting link of FIG. 3, viewed along section 8-8.
Figure 9:
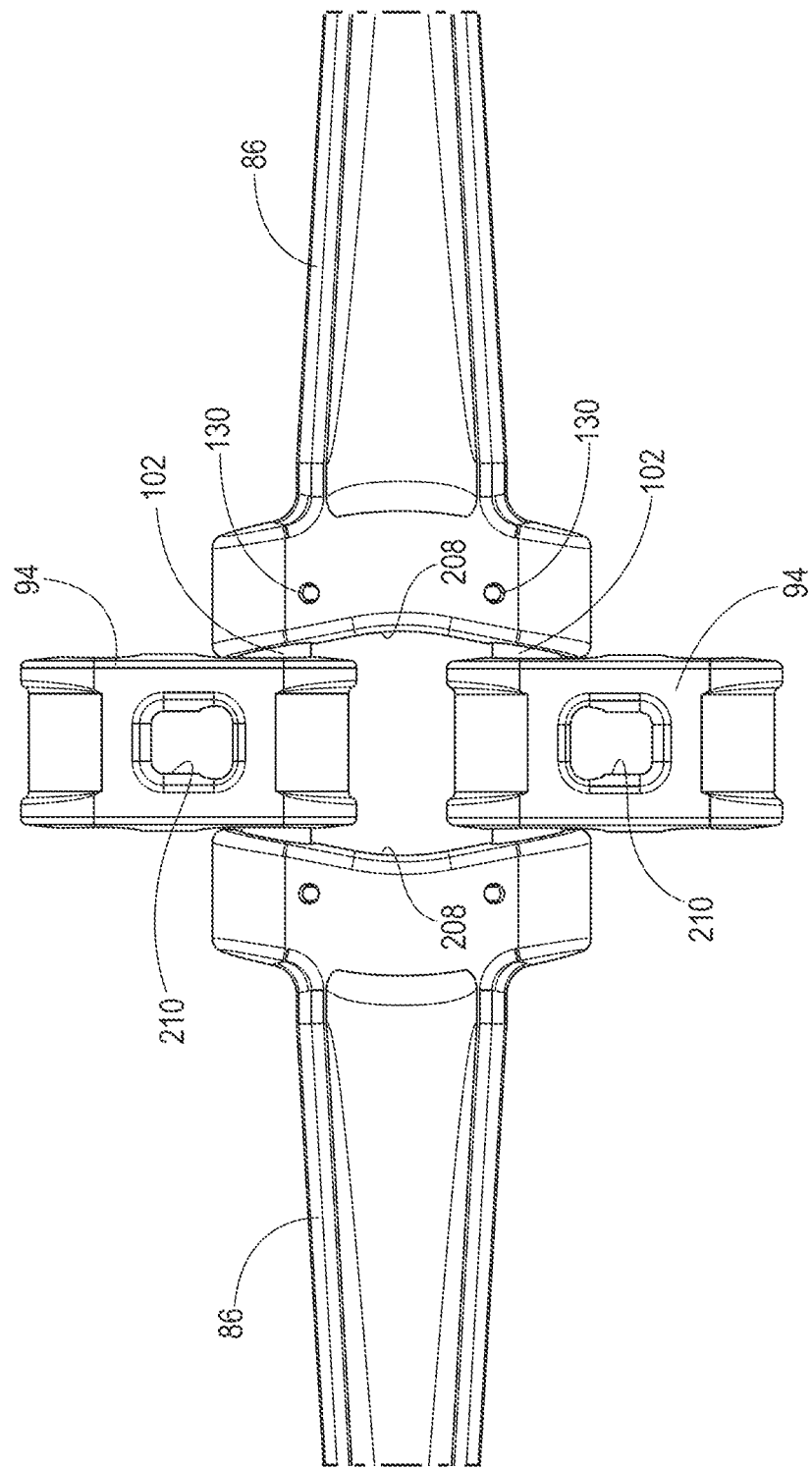
FIG. 9 is a plan view of the chain conveyor unit of FIG. 2.
Figure 10:
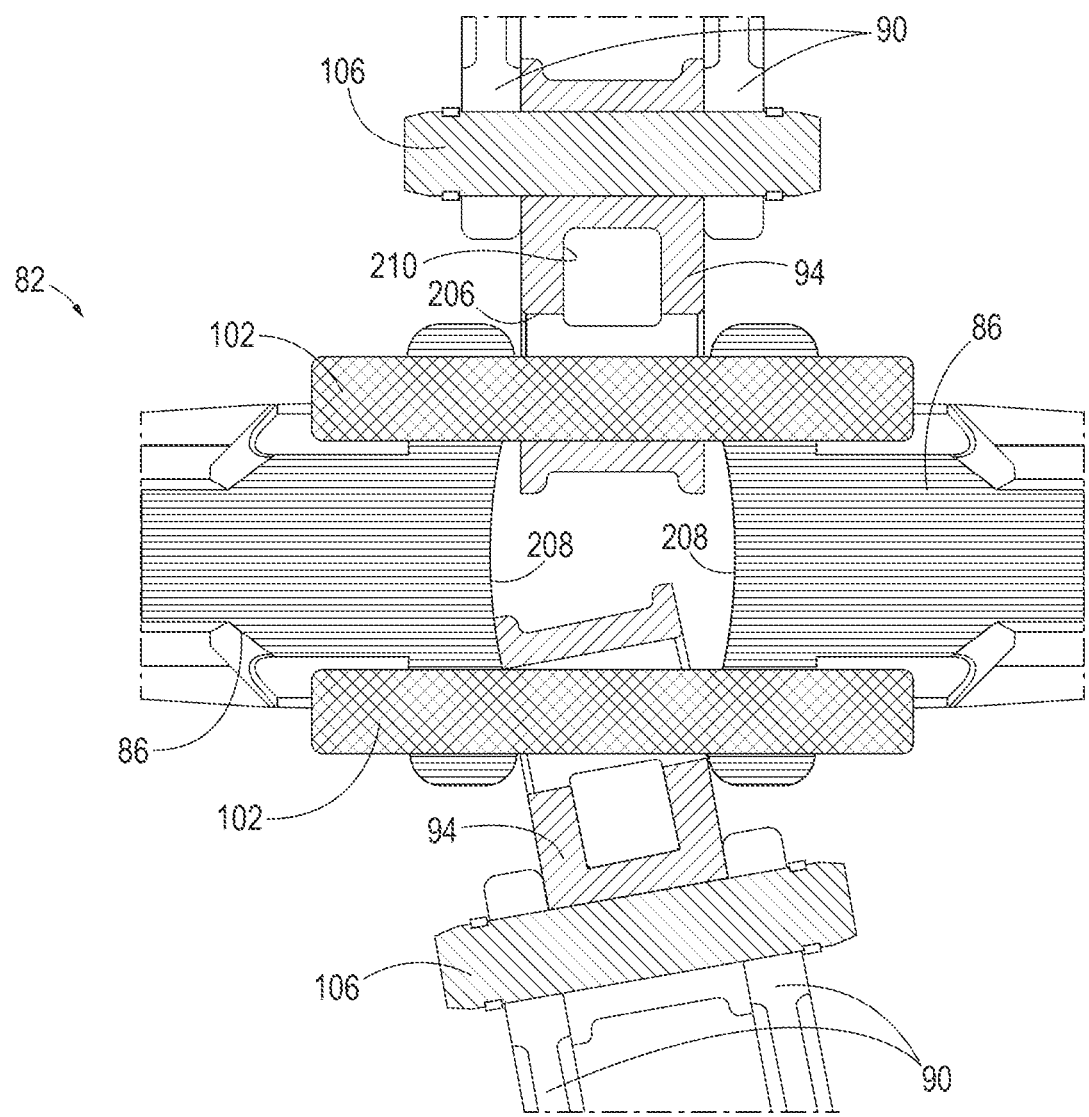
FIG. 10 is a section view of a chain conveyor unit with a connecting link oriented at an angle relative to the flights.

As shown in FIGS. 7 and 8, the connecting link 94 includes a first end 190 and a second end 194, and a link axis 198 extended between the first end 190 and the second end 194. The link 94 includes shoulders or ridges 200 that protrude from the portions adjacent the ends 190, 194. In addition, a first opening 202 and a second opening 206 extend laterally from one side of the connecting link 94 to another opposite side of the connecting link 94. In the illustrated embodiment, the first opening 202 has a substantially circular profile, while the second opening 206 has an oblong or oval profile. The oblong profile of the second opening 206 permits pivoting movement of the connecting link 94 relative to the flight pins 102 (FIG. 4). As shown in FIGS. 9 and 10, the inner surface 208 of the flight links 86 may have an arcuate or concave profile to facilitate pivoting movement of the connecting link 94.

The connecting link 94 has an increased outer wall thickness compared to conventional links, thereby providing greater strength and durability. In addition, the connecting link 94 has a unitary or single-piece construction to reduce the number of parts and reduce wear.

In addition, the connecting link 94 includes a relief opening 210 extending between one side of the link 94 to the other side. In the illustrated embodiment, the relief opening 210 extends through the connecting link 94 from an upper surface 214 to a lower surface 218 (e.g., in a substantially vertical direction). The relief opening 210 may be tapered outwardly from a center of the link 94 in each direction, toward the upper surface 214 and the lower surface 218. In addition, the relief opening 210 at least partially intersects the second opening 206, such that the second opening 206 provides communication with the relief opening 210. During operation of the conveyor, particulate material (e.g., dirt)

may accumulate in the second opening 206. The relief opening 210 permits removal or evacuation of the particulate material from the second opening 206.

Although the conveyor is described above with respect to a continuous mining machine, it is understood that the conveyor may be incorporated into other types of machines including but not limited to roadheaders and entry drivers, as well as loading and hauling machines including but not limited to shuttle cars, battery haulers, or other types.

Although aspects have been described in detail with reference to certain preferred embodiments, variations and modifications exist within the scope and spirit of one or more independent aspects as described.

What is claimed is:

1. A link for a conveyor chain, the link comprising:
a link body including a first end, a second end opposite the first end, and a center plane extending through the first end and second end;
a first opening proximate the first end and extending in a direction transverse to a direction of travel of the link, the first opening configured to receive a first connecting member;
a second opening proximate the second end and extending in a direction transverse to the direction of travel of the link, the second opening configured to receive a second connecting member; and
a relief opening extending through the link body and positioned between the first end and the second end, one portion of the relief opening tapering inwardly from an upper surface of the link body toward the center plane, and another portion of the relief opening tapering inwardly from a lower surface of the link body toward the center plane.

2. The link of claim 1, wherein at least one of the first opening and the second opening has an oblong profile.

3. The link of claim 1, wherein the relief opening is perpendicular to a direction of travel of the link, and wherein the relief opening is perpendicular to the first opening.

4. The link of claim 1, wherein the at least one relief opening tapers outwardly from a center of the link.

5. The link of claim 1, wherein the relief opening at least partially intersects the second opening.

6. The link of claim 5, wherein the second opening has an oblong profile that is elongated in a direction parallel to the direction of travel, and wherein the relief opening intersects a portion of the second opening.

7. A link for a conveyor chain, the link comprising:
a body having an inner surface, the inner surface including at least one opening therein, the at least one opening configured to receive a coupling pin; and
a flight bar extending laterally from the body opposite the inner surface, the flight bar including a leading side and a trailing side, a lower surface of the flight bar including a first edge proximate the leading side and a second edge proximate the trailing side, the flight bar further including a recess disposed between the first edge and the second edge and extending at least partially along a length of the flight bar.

8. The link of claim 7, wherein the recess has an arcuate profile relative to a transverse section of the flight bar.

9. The link of claim 7, wherein a side of the flight bar adjacent the recess is convex.

10. The link of claim 7, wherein the flight bar is symmetric about a plane containing a direction of travel of the link.

11. The link of claim 7, wherein the flight bar has an X-shaped profile when viewed along a longitudinal extent of the flight bar.

12. The link of claim 7, wherein the inner surface of the body is arcuate.

13. The link of claim 7, wherein the opening is a blind hole configured to receive a pin.

14. The link of claim 7, wherein the recess tapers toward a distal end of the flight bar.

15. A conveyor chain comprising:
a first flight link including an arcuate inner surface facing a centerline of the conveyor chain and a flight bar extending laterally away from the centerline of the conveyor chain, the flight bar including a recess defining two edges configured to scrape material along a conveyor deck;
a second flight link disposed laterally opposite the first flight link, the second flight link including an arcuate inner surface facing the centerline of the conveyor chain and a flight bar extending laterally away from the centerline of the conveyor chain in a direction opposite the flight bar of the first flight link, the flight bar including a recess defining two edges configured to scrape material along the conveyor deck;
a connecting link positioned between the first flight link and the second flight link, the connecting link including a relief opening extending therethrough; and
at least one pin coupling the first flight link, the connecting link, and the second flight link.

16. The conveyor chain of claim 15, wherein the at least one pin pivotally couples the connecting link to the first flight link and the second flight link, the connecting link configured to pivot within a plane containing a longitudinal axis of the at least one pin and the centerline of the conveyor chain.

17. The conveyor chain of claim 15, further comprising a retainer configured to secure the first flight link and the second flight link to the pin.

18. The conveyor chain of claim 17, wherein the retainer is formed of a polymeric material.

19. The conveyor chain of claim 17, wherein the retainer is a wire.

* * * * *